United States Patent [19]

Mosure

[11] Patent Number: 4,948,336
[45] Date of Patent: Aug. 14, 1990

[54] MECHANICAL SHAFT SEAL

[75] Inventor: Duane Mosure, Poplar Grove, Ill.

[73] Assignee: Sundstrand Corporation, Rockford, Ill.

[21] Appl. No.: 351,306

[22] Filed: May 4, 1989

Related U.S. Application Data

[63] Continuation-in-part of Ser. No. 131,103, Dec. 10, 1987, abandoned.

[51] Int. Cl.⁵ .............................................. F04D 29/08
[52] U.S. Cl. ................................ 415/172.1; 415/173.6; 415/174.2; 277/27; 277/152
[58] Field of Search ............... 415/170.1, 172.1, 173.1, 415/173.3, 173.6, 174.2; 277/27, 152

[56] References Cited

U.S. PATENT DOCUMENTS

| | | | |
|---|---|---|---|
| 971,850 | 10/1910 | Krogh | 415/172.1 |
| 2,270,054 | 1/1942 | Hogan | 415/172.1 |
| 3,228,342 | 1/1966 | Page | 415/113 |
| 3,238,534 | 3/1966 | Hartland | 415/116 |
| 3,510,230 | 5/1970 | Raub | 415/174.2 |
| 3,554,661 | 1/1971 | Oglesby | 415/112 |
| 3,741,679 | 6/1973 | Johnson | 415/172.1 |
| 4,260,165 | 4/1981 | Hartelius | 277/152 |
| 4,269,564 | 5/1981 | Naffziger | 415/58.3 |
| 4,505,637 | 3/1985 | Raczynski | 415/112 |
| 4,538,959 | 9/1985 | Cantor et al. | 415/98 |

FOREIGN PATENT DOCUMENTS

| | | | |
|---|---|---|---|
| 1118313 | 6/1956 | France | 277/27 |
| 113861 | 9/1981 | Japan | 277/152 |

OTHER PUBLICATIONS

Mallaire et al, "Evaluation of Wear Ring Seals for High-Speed, High-Pressure Turbopumps", *Journal of Lubrication Technology*, Jul. 1968.

*Primary Examiner*—Edward K. Look
*Assistant Examiner*—John T. Kwon
*Attorney, Agent, or Firm*—Wood, Phillips, Mason, Recktenwald & Van Santen

[57] ABSTRACT

A seal for a pump impeller (22) comprising an annular ring (50) freely received within a cylindrical opening (56) in the pump housing (12) and disposed around a cylindrical portion of the impeller (22).

9 Claims, 1 Drawing Sheet

MECHANICAL SHAFT SEAL

This application is a continuation-in-part application of application Ser. No. 131,103, filed December 10, 1987, now abandoned.

TECHNICAL FIELD

The present invention relates to pumps, and more particularly to a seal for an aircraft fuel pump.

BACKGROUND ART

Fuel pumps usable in aircraft engines are, obviously, crucial to the safe operation of the aircraft. Such pumps are commonly centrifugal pumps with impellers operating at 25,000-35,000 rpm to raise fuel pressure from around 50 psi at the pump inlet to over 900 psi at the impeller outlet. This pressure differential between the inlet and the outlet results in significant back flow or leakage back around the impeller (between the impeller and the housing) from its high pressure outlet to its low pressure inlet.

One approach to sealing against such leaking has been to minimize the clearance between the impeller and either the housing or an intermediate sealing member fixed to the housing. Even with close manufacturing tolerances, however, it has not been possible to reduce this diametral clearance to less than about 6-10 thousandths of an inch, which minimal clearance is required in view of a number of factors, including centrifugal and thermal growth, and imprecision in establishing and maintaining the axis of rotation of the impeller in the housing. As a result of this required clearance, prior art pumps moving, for example, 200 gallons per minute have commonly leaked as much as 30-40 gallons per minute of that back to the inlet.

Still other seals which have been used in the prior art include labyrinth seals which define tortuous paths in order to attempt to minimize any leakage of fluids therethrough. Such seals are shown, for example, in U.S. Pat. No. 4,269,564 and U.S. Pat. No. 3,238,534. Such pumps still can allow 15-20% leakage such as previously described.

Leakage as described above not only reduces the capacity of the pump, but also increases the horsepower required for a desired pump output. For example, during flight and ground idle when the engines require little fuel but the pump is still operating at design speeds, the action of the pump will increase the fuel temperature, which also results in a requirement of more power for the pump (e.g., from 50 horsepower to 90 horsepower). It is, of course, desirable to minimize the horsepower requirements of any aircraft component.

The present invention is directed to overcoming one or more of the problems as set forth above.

SUMMARY OF THE INVENTION

In one aspect of the present invention, a seal for a pump impeller is provided comprising an annular ring freely received within a cylindrical opening in the pump housing and disposed around a cylindrical portion of the impeller.

One object of the present invention is to provide a seal which minimizes the leakage back around the impeller from its outlet to its inlet. It is another object of the present invention to minimize the size and weight requirements of a pump necessary to produce a design output. Still another object of the present invention is to minimize the horsepower requirements for a given pump output. Yet another object of the present invention is to provide a reliable fuel pump for use with aircraft engines.

DESCRIPTION OF THE PREFERRED EMBODIMENT

Figure 1:
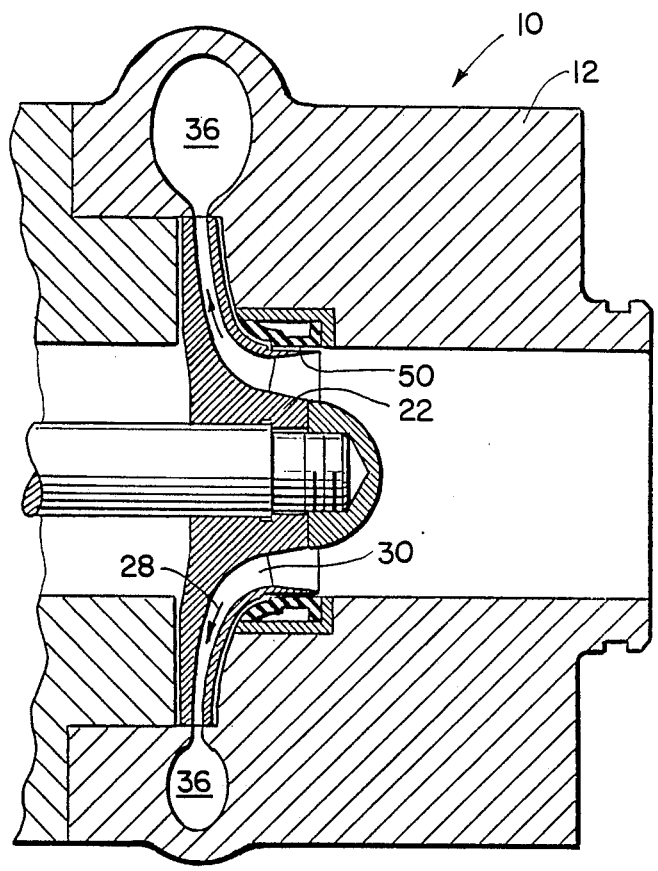
FIG. 1 is a cross-sectional view of a portion of an aircraft fuel pump illustrating the impeller seals of the present invention.

A fuel pump 10 embodying the present invention is shown in FIG. 1. The pump 10 includes a housing 12 which suitably supports a shaft 14. The shaft 14 has a suitable spline connection with the pump impeller 22.

The pump 10 is a centrifugal pump which draws fuel through an input (not shown), and then (as indicated by arrow 28) through radial blades or vanes 30 in the impeller 22. The fuel is ejected from the impeller 22 into a pump outlet 36.

It should be understood that the illustrated pump 10 is merely exemplary of the type of pumps with which the present invention could be used. Modifications to various parts of the illustrated pump 10 could thus be made within the scope of the present invention.

As will be understood by those skilled in the art, the fluid pressure at the input of the impeller blades 30 is substantially less than the fluid pressure at the impeller blade output (for example, 130 psi versus over 900 psi). Thus, there is a tendency for the fluid at the output to leak back between the housing 12 and the outside of the impeller 22.

Figure 2:
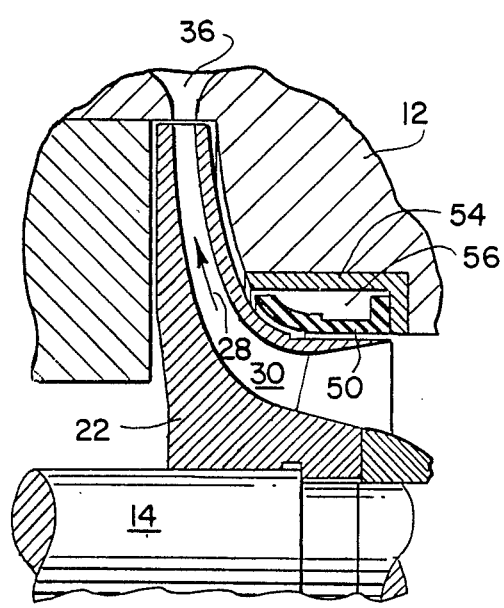
FIG. 2 is an enlarged view of a portion of FIG. 1 showing the seals of the present invention.

The shaft seal structure of the present invention is best illustrated in FIG. 2, in which the spacing of the components is exaggerated for purposes of illustration. The seal structure includes a seal or annular ring 50 which seals against leakage around the impeller 22.

The seal 50 comprises a ring of very hard material such as carbide within a ring 54 made of hard steel or the like and interference fit within the housing 12 (which is commonly made of aluminum). The cylindrical section 56 defined by the support ring 54 could also be formed by a suitably hard integral portion of the housing as well.

The seal 50 has a diametral clearance between its outer surface and the support ring 54 (of, e.g., about twenty thousandths) so that the seal floats in the cylindrical section 56. The seal 50 has a radial flange 58 at its input end, which flange 58 seats on the radial shoulder 60 of the support ring 54 during operation. An offset portion 62 is also provided at the outlet end of the seal 50, which portion 62 both minimizes the mass of the seal 50 and provides a spacing from the impeller 22 to minimize fluid friction and resulting power loss.

The seal 50 includes a cylindrical portion 64 which is disposed around the cylindrical portion 66 of the impeller 22. Inasmuch as the seal 50 floats, it will track the outer diameter of the impeller cylindrical portion 66 and can thus be provided with a minimal diametral clearance from the impeller cylindrical portion 66 (e.g., five thousandths of an inch and less), and therefore substantially minimize leakage therethrough (e.g., to substantially less than ten gallons per minute versus 30-40 gallons per minute leakage commonly found in prior art pumps pumping 200 gallons per minute).

A pump having the seal structure of the present invention will thus have minimal leakage around the impeller from its outlet to its inlet. Accordingly, such a pump will have minimal horsepower requirements for desired outputs, which in turn allows for the size and weight of the pump to be minimized for particular design outputs.

Other aspects, objects and advantages of the present invention can be obtained from a study of the drawings, the specification and the appended claims.

I claim:

1. In an aircraft fuel pump having a housing with an impeller between an inlet and an outlet, an improved seal for preventing leakage between the impeller and the housing, comprising:

an annular ring loosely received to float within a cylindrical opening in said housing and disposed around a cylindrical portion of said impeller, said ring having an outer diameter which is less than the housing cylindrical opening inner diameter, and a radially extending annular flange which seats on a radially extending shoulder at the inlet side of the cylindrical opening to provide a seal over substantially the entire width of the flange, wherein said ring inner diameter has a diametral clearance over the impeller cylindrical portion less than or equal to five thousandths of an inch.

2. The improved seal of claim 1, wherein said cylindrical opening is defined by a cylindrical steel collar secured within said housing by an interference fit.

3. The improved seal of claim 1, wherein said diametral clearance is provided between said impeller and said ring only at the impeller cylindrical portion, with the clearance between said impeller and said ring at other locations being substantially greater than five thousandths of an inch.

4. The improved seal of claim 1, further comprising a second annular ring received within a second cylindrical opening in said housing and disposed around a second cylindrical portion of said impeller, said second ring having an outer diameter which is less than the housing second cylindrical opening inner diameter and further having a second radially extending annular flange which seats on a second radially extending shoulder opposite the outlet side of the second cylindrical opening to provide a seal over substantially the entire width of the second flange, said first and second rings being axially spaced on opposite sides of the impeller outlet.

5. The pump of claim 4, wherein said seal ring has an outer diameter which is less than the inner diameter of the housing cylindrical section.

6. The pump of claim 4, wherein said diametral clearance is provided between said impeller and said ring only at the impeller cylindrical portion, with the clearance between said impeller and said ring at other locations being substantially greater than five thousandths of an inch.

7. The pump of claim 4, wherein said housing cylindrical section is defined by a cylindrical steel collar secured within said housing by an interference fit.

8. The pump of claim 4, wherein said annular seal ring is made of carbide.

9. An aircraft fuel pump, comprising:

a housing having a cylindrical section, an input, and an output;

an impeller supported for rotation in said housing, said impeller drawing aircraft fuel from said housing input and ejecting it at an elevated pressure toward said housing output, said impeller having a portion cylindrical about its axis of rotation; and an annular seal ring freely received within the housing cylindrical section and around said impeller cylindrical portion, said ring having a radially extending annular flange which seats on a radially extending shoulder at the inlet side of the cylindrical opening to provide a seal over substantially the entire width of the flange to seal against back flow of the fluid at elevated pressure around the impeller toward the housing input wherein said ring inner diameter has a diametral clearance over the impeller cylindrical portion which is less than or equal to five thousandths of an inch.

* * * * *